United States Patent
Oriol et al.

(10) Patent No.: US 9,355,464 B2
(45) Date of Patent: May 31, 2016

(54) DYNAMIC GENERATION OF TEXTURE ATLASES

(71) Applicant: Apple Inc., Cupertino, CA (US)

(72) Inventors: Timothy R. Oriol, Cupertino, CA (US); Domenico P. Porcino, Novato, CA (US); Jacques P. Gasselin de Richebourg, Sunnyvale, CA (US); Norman N. Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 14/292,742

(22) Filed: May 30, 2014

(65) Prior Publication Data

US 2015/0348280 A1 Dec. 3, 2015

(51) Int. Cl.
- G09G 5/00 (2006.01)
- G06T 7/40 (2006.01)
- G06T 7/00 (2006.01)

(52) U.S. Cl.
CPC ............... G06T 7/40 (2013.01); G06T 7/0085 (2013.01)

(58) Field of Classification Search
CPC .............................. G06T 15/04; G06T 11/001
USPC .......................................................... 345/582
See application file for complete search history.

(56) References Cited

U.S. PATENT DOCUMENTS

| | | | |
|---|---|---|---|
| 5,982,939 A * | 11/1999 | Van Hook | 382/255 |
| 6,373,482 B1 | 4/2002 | Migdel | |
| 8,204,338 B2 | 6/2012 | Hoppe | |
| 8,855,410 B2 * | 10/2014 | Fenney | 382/162 |
| 2003/0011637 A1 | 1/2003 | Boudier | |
| 2006/0170695 A1 * | 8/2006 | Zhou et al. | 345/582 |
| 2006/0256126 A1 * | 11/2006 | Lin | 345/589 |
| 2006/0284880 A1 * | 12/2006 | Zhou et al. | 345/582 |
| 2008/0094411 A1 * | 4/2008 | Parenteau et al. | 345/592 |

(Continued)

FOREIGN PATENT DOCUMENTS

| | | | |
|---|---|---|---|
| JP | 4521167 B2 | 5/2010 | |
| KR | 1020040106300 A | 12/2004 | |

OTHER PUBLICATIONS

Mengmeng Zhang, Qianqian Li, Lei Li, and Peirui Bai, "An improved algorithm based on the gvf-snake for effective concavity edge detection," Software Engineering and Applications, 2013.*

(Continued)

*Primary Examiner* — Devona Faulk
*Assistant Examiner* — Jin Ge
(74) *Attorney, Agent, or Firm* — Blank Rome LLP (57) ABSTRACT

Systems, methods and program storage devices are disclosed, which comprise instructions to cause one or more processing units to analyze input images to a texture atlas and determine how each texture should be modified before being stored in the texture atlas to prevent undesirable drawing artifacts. For example, "tileable" images may be identified on a per-edge basis (e.g., by determining whether each edge pixel is above a certain opacity threshold). The tileable images may then be modified, e.g., by extruding a 1-pixel border identical to the outer row of pixels, before being stored in the texture atlas. "Character"-type sprites may also be identified on a per-edge basis (e.g., by determining whether each edge pixel is below the opacity threshold). The character-type sprites may then by modified by adding a single pixel transparent border around the outer rows of pixels before being stored in the texture atlas.

20 Claims, 8 Drawing Sheets

(56) References Cited

U.S. PATENT DOCUMENTS

| | | | |
|---|---|---|---|
| 2013/0016112 A1 | 1/2013 | Burley | |
| 2013/0051701 A1* | 2/2013 | Bloomfield et al. | 382/293 |
| 2013/0286025 A1* | 10/2013 | Spells et al. | 345/473 |
| 2014/0267346 A1* | 9/2014 | Ren et al. | 345/582 |
| 2014/0333621 A1* | 11/2014 | Hillesland et al. | 345/423 |

OTHER PUBLICATIONS

Gamma correction—Wikipedia, the free encyclopedia, https://web.archive.org/web/20130801093657/http://en.wikipedia.org/wiki/Gamma_correction, version Aug. 1, 2013.*

Matthias Trapp & Jürgen Döllnery, "Interactive Rendering to View-Dependent Texture-Atlases", Eurographics 2010.*

C. Poynton, "The rehabilitation of gamma," in Proc. SPIE Human Vision and Electronic Imaging III, B. E. Rogowitz and T. N. Pappas, Eds., San Jose, CA, 1998, pp. 232-249.*

Aliaga D et al: "MMR: An Interactive Massive Model Rendering System Using Geometric and Image-Based Acceleration", Proceedings of the 1999 Symposium on Interactive 3D Graphics. Atlanta, GA, Apr. 26-28, 1999; [Proceedings of the Symposium on Interactive 3D Graphics], New York, NY: ACM, US, Apr. 26, 1999, pp. 199-206, 237, XP01032569, ISBN: 978-1-58113-082-9.

Durbin J. et al: "Amortizing 3D Graphics Optimization Across Multiple Frames", UIST '95. 8th Annual Symposium on User Interface Software and Technology. Proceedings of the ACM Symposium on User Interface Software and Technology. Pittsburgh, PA, Nov. 14-17, 1995; [ACM Symposium on User Interface Software and Technology], New York, NY, Nov. 14, 1995, pp. 13-19, XP000634410, DOI: 10.1145/215585.215633, ISBN:0-89791-709-X.

Gobbetti E. et al: "Technical strategies for massive model visualization", ACM SIGGRAPH Asia 2008 Courses, SIGGRAPH Asia '08 2008 Association For Computing Machinery USA, Jun. 2, 2008, pp. 405-415, XP002634823, DOI: 10.1145/1508044.1508073.

H. Buchholz et al: "View-Dependent Rendering of Multiresolution Texture-Atlases", VIS 05. IEEE Visualization, 2005, Oct. 2005, pp. 215-222, XP055102974, DOI: 10.1109/VISUAL.2005.1532798, ISBN: 978-0-78-039462-9.

Igehy H. et al: "Prefetching In a Texture Cache Architecture", Proceedings of the 1998 Eurographics/SIGGRAPH Workshop on Graphics Hardware. Lisbon, Aug. 31-Sep. 1, 1998; [Eurographics/SIGGRAPH Workshop on Graphics Hardware] New York, NY: ACM, US. vol. Workshop 2, Aug. 31, 1998, pp. 133-142, XP001017001, ISBN: 978-1-58113-097-3.

Martin Kada et al: "Real-Time Visualisation of Urban Landscapes Using Open-Source Software", 2003, pp. 1-4, SP055102973, Retrieved from the Internet: URL: http://w0064806.dd6812.kasserver.com/papers/IMPOSTOR.PDF [retrieved on Feb. 18, 2014].

Torborg J et al: "Talisman: Commodity Realtime 3D Graphics For the PC", Computer Graphics Proceedings 1996 (SIGGRAPH). New Orleans, Aug. 4-9, 1996; [Computer Graphics Proceedings (SIGGRAPH)], New York, NY: ACM, US, Aug. 4, 1996. pp. 353-363, XP000682751.

* cited by examiner

DYNAMIC GENERATION OF TEXTURE ATLASES

CROSS-REFERENCE TO RELATED APPLICATION

This disclosure is related to the co-pending, commonly-assigned patent application filed Oct. 25, 2013, entitled, "Sprite Graphics Rendering System," and having U.S. patent application Ser. No. 14/063,970 ("the '970 application"). The '970 application is hereby incorporated by reference in its entirety.

BACKGROUND

This disclosure relates generally to the field of computer graphics. More particularly, but not by way of limitation, it relates to technique for manipulating textures in a rendering system for use with a graphics processing unit (GPU).

A texture is a two-dimensional (2D) image that may be mapped onto a 2D or 3D surface and integrated into a larger scene. Textures may be created from any source, including pre-rendered imagery, dynamic 3D graphics, vector art, and even text. As GPUs have become more prevalent, libraries of textures and graphic processing routines have been developed to provide a rendering system that allows for the use of the power of GPUs for faster rendering of graphics—rather than depending entirely on the processing power of common central processing units (CPUs). Generally, both CPUs and GPUs are involved in graphics processing operations involving mapped textures, with much of the graphics processing being handled by the GPUs.

Groups of textures to be used in a particular application may also be stored in what is known as a "texture atlas," in order to increase memory efficiency and performance of the application. A texture atlas is simply a large image containing a collection of smaller sub-images, e.g., textures, which may be "trimmed" (e.g., trimmed of superfluous transparent padding pixels) and then placed closely together with adjacent textures. The resulting texture atlas may contain many smaller sub-images, each of which may be used as a texture for some part of a 2D or 3D object to be rendered in the particular application. The individual textures may then be rendered by specifying the texture coordinates of the individual texture in the atlas to point to the particular part of the large image where the individual texture that the application is attempting to render is located. In an application where many small textures are used frequently, it is often more efficient to store the textures in a single texture atlas, which may be treated as a single unit by the graphics hardware, resulting in fewer texture bindings.

One texel (i.e., texture element) of a texture may cover more or less than one pixel in the ultimate display space, so the texel values in the texture may be averaged to produce the final output pixel values for the display space. For example, if the GPU is attempting to draw a texture smaller or larger than its "actual" size in texture atlas (and it's not being drawn larger or smaller by a factor of 2), or if the texture has been rotated, or if the texture is moving across a screen and falls halfway across a pixel, it may result in undesirable visible "seams" between the textures in the display space.

When a GPU is being used to draw a single texture, the developer may also specify a "wrap mode" for the edges of a texture. For example, one option for wrapping is referred to herein as "clamp" mode. Clamp mode simply repeats the value of the edge pixel of the texture for one additional pixel out from the existing edge of the texture. Another option for wrapping is referred to herein as "wrap" mode, which would instead average the edge pixel with the value of the pixel on the opposite side of the texture. This way, when the texture is filtered for tiled display in the ultimate display space, there are no transparent or semi-transparent seams between the tiled textures. Other times, when a developer desires to have smooth, i.e., anti-aliased edges, he or she may specify to draw the texture with a "linear" interpolation mode, which can smoothly interpolate between the pixels abutting the would-be seam region for the pixels located in the would-be seam.

Unfortunately, when generating a texture atlas (i.e., the single large image comprised of many smaller individual sub-textures), the hardware may not be able to determine where the edges of each individual sub-texture are. Further, it is not possible to specify multiple interpolation modes for the various sub-textures that will be stored inside the texture atlas, so these approaches can no longer be used. What is needed are techniques to intelligently analyze and modify incoming textures as they are placed into the texture atlas by a developer so that the textures will be perceptually equivalent when they're drawn in the ultimate display space, even in tiled fashion.

SUMMARY

Techniques are disclosed herein for analyzing input images to a texture atlas and determining how each texture should be modified before being stored in the texture atlas to prevent undesirable drawing artifacts, while still maintaining the memory efficiencies gained by using a texture atlas. For example, "tileable" images may be identified on a per-edge basis (e.g., by determining whether each edge pixel is above a certain opacity threshold). The tileable images may then be modified, e.g., by extruding a 1-pixel border identical to the outer row of pixels, before being stored in the texture atlas. "Character"-type sprites may also be identified on a per-edge basis (e.g., by determining whether each edge pixel is below the opacity threshold). The character-type sprites may then by modified by adding a single pixel transparent border around the outer rows of pixels before being stored in the texture atlas. When each sub-texture is then rendered, e.g., as sprites in a graphical application, these pixel extrusions produce the appropriate filtering effects when drawn in the ultimate display space. Further refinements and/or heuristics may also be employed to the texture and sprite characterization rules described above. For example, the concavity of the edge may be examined to attempt to confirm or deny the identifications made based on the opacity of the edge pixels.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The processes depicted in the figures that follow are performed by processing logic that comprises hardware (e.g., circuitry, dedicated logic, etc.), software (such as is run on a general purpose computer or a dedicated machine), or a combination of both. Although the processes are described below in terms of some sequential operations, some of the operations described may be performed in different order, and some operations may be performed in parallel rather than sequentially.

A Graphics Processing Unit (GPU) may be a dedicated graphics processor implementing highly efficient graphics operations, such as 2D graphics operations, 3D graphics operations and/or digital video related functions. A GPU may include special (programmable) hardware to perform graphics operations, e.g., blitter operations, texture mapping, polygon rendering, pixel shading, and vertex shading. GPUs are known to fetch data from a frame buffer and blend pixels together to render an image back into the frame buffer for display. GPUs may also control the frame buffer and allow the frame buffer to be used to refresh a display, such as a CRT or LCD display. Conventionally, GPUs may take graphics processing tasks from one or more central processing units (CPUs) coupled with the GPUs to output raster graphics images to display devices through display controllers.

A typical GPU is a Single Instruction Multiple Data (SIMD) device, in which each instruction may operate on multiple pieces of data in parallel. Just as CPUs have developed from single processing units to multiple core processors that can execute instructions separately in each core, more recent GPUs provide "lanes" of vector computation, each of which can be interpreted as a separate thread. A single hardware sequencer typically operates on a group of such threads in parallel. If all execute the same instruction, they are said to be coherent. A single instruction fetch is broadcast to all of the individual processing elements. If the threads branch in different directions, they are said to be diverged. The single instruction sequencer keeps track of which threads have diverged.

Figure 1:
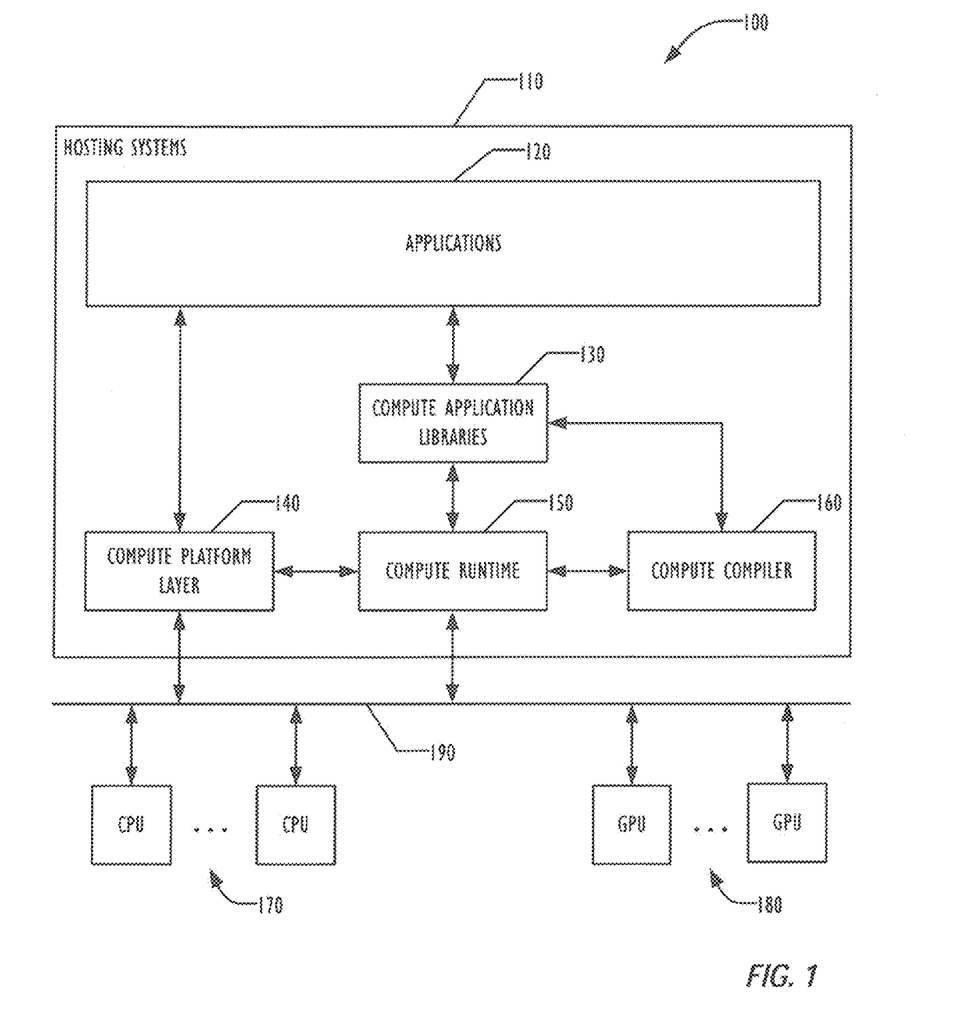
FIG. 1 is a block diagram illustrating one embodiment of a graphics rendering system.

FIG. 1 is a block diagram illustrating one embodiment of a graphics rendering system 100 that uses computing devices including CPUs and/or GPUs to perform parallel computing for applications. System 100 may implement a parallel computing architecture. In one embodiment, system 100 may be a graphics system including one or more host processors coupled with one or more CPUs 170 and one or more GPUs 180 through a data bus 190. The plurality of host processors may be networked together in a host system 110. The plurality of CPUs 170 may include multi-core CPUs from different vendors. A computer processing unit or compute unit, such as CPU or GPU, may be associated by a group of capabilities. For example, a GPU may have dedicated texture rendering hardware. Another media processor may be a GPU supporting both dedicated texture rendering hardware and double precision floating point arithmetic. Multiple GPUs may be connected together.

In one embodiment, the host systems 110 may support a software stack. The software stack can include software stack components such as applications 120, compute application libraries 130, a compute platform layer 140, e.g., an OpenCL platform, a compute runtime layer 150, and a compute compiler 160. An application 120 may interface with other stack components through API calls. One or more processing elements or threads may be running concurrently for the application 120 in the host systems 110. The compute platform layer 140 may maintain a data structure, or a computing device data structure, storing processing capabilities for each attached physical computing device. In one embodiment, an application may retrieve information about available processing resources of the host systems 110 through the compute platform layer 140. An application may select and specify capability requirements for performing a processing task through the compute platform layer 140. Accordingly, the compute platform layer 140 may determine a configuration for physical computing devices to allocate and initialize processing resources from the attached CPUs 170 and/or GPUs 180 for the processing task.

The compute runtime layer 109 may manage the execution of a processing task according to the configured processing resources for an application 103, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a GPU. The compute runtime layer 109 may interact with the allocated physical devices to carry out the actual execution of the processing task. In one embodiment, the compute runtime layer 109 may coordinate executing multiple processing tasks from different applications according to run time states of each processor, such as CPU or GPU configured for the processing tasks. The compute runtime layer 109 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 109 may track the status of each executed processing task by monitoring the run time execution status of each processor.

The runtime layer may load one or more executables as compute program executables corresponding to a processing task from the application 120. In one embodiment, the compute runtime layer 150 automatically loads additional executables required to perform a processing task from the compute application library 130. The compute runtime layer 150 may load both an executable and its corresponding source program for a compute program object from the application 120 or the compute application library 130. A source program for a compute program object may be a compute program source. A plurality of executables based on a single compute program source may be loaded according to a logical computing device configured to include multiple types and/or different versions of physical computing devices. In one embodiment, the compute runtime layer 150 may activate the compute compiler 160 to online compile a loaded source program into an executable optimized for a target processor, e.g., a CPU or a GPU, configured to execute the executable.

An online compiled executable may be stored for future invocation in addition to existing executables according to a corresponding source program. In addition, the executables may be compiled offline and loaded to the compute runtime 150 using API calls. The compute application library 130 and/or application 120 may load an associated executable in response to library API requests from an application. Newly compiled executables may be dynamically updated for the compute application library 130 or for the application 120. In one embodiment, the compute runtime 150 may replace an existing compute program executable in an application by a new executable online compiled through the compute compiler 160 for a newly upgraded version of computing device. The compute runtime 150 may insert a new executable online compiled to update the compute application library 130. In one embodiment, the compute runtime 150 may invoke the compute compiler 160 when loading an executable for a processing task. In another embodiment, the compute compiler 160 may be invoked offline to build executables for the compute application library 130. The compute compiler 160 may compile and link a compute kernel program to generate a computer program executable. In one embodiment, the compute application library 130 may include a plurality of functions to support, for example, development toolkits and/or image processing. Each library function may correspond to a computer program source and one or more compute program executables stored in the compute application library 130 for a plurality of physical computing devices.

Texture Atlases

As explained above, texture atlases are simply large images containing a collection of smaller sub-images that are placed closely together, with individual sub-images stored at particular locations within the texture atlas, as represented by a relative coordinate system.

Figure 2:
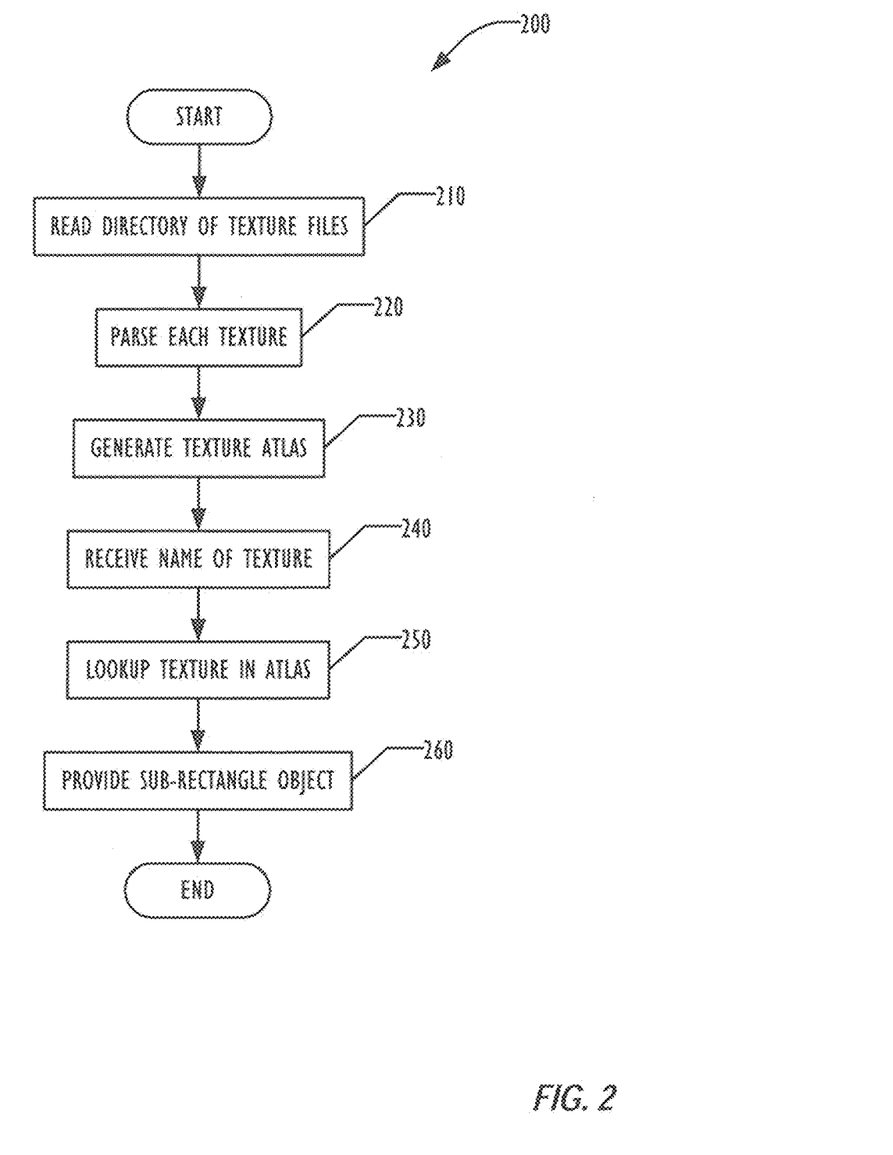
FIG. 2 is a flowchart illustrating a technique for automatically generating a texture atlas, according to one embodiment.

Developers can run a single automation tool as illustrated in FIG. 2 by flowchart 200 that takes a directory of texture files (PNG, JPG, TIFF etc.) in block 210, parses each individual texture in block 220, and generates a texture atlas in block 230 (typically as a single JPG or PNG, but in any desired format), along with a manifest file in XML format that records the texture coordinates and dimensions in the texture atlas. Later, when the rendering system receives the name of the texture as specified by the developer in block 240, in block 250 a lookup occurs to find the desired texture, and finally in block 260 to provide the sub-rectangle of the atlas with the desired texture.

The developer may then request the image by name, which is received in block 240. The graphics system locates the atlas file, loads it into the GPU, looks up the texture in the atlas in block 250, then provides an object representing the sub-rectangle of the atlas which contains the original image data in block 260.

Figure 3:
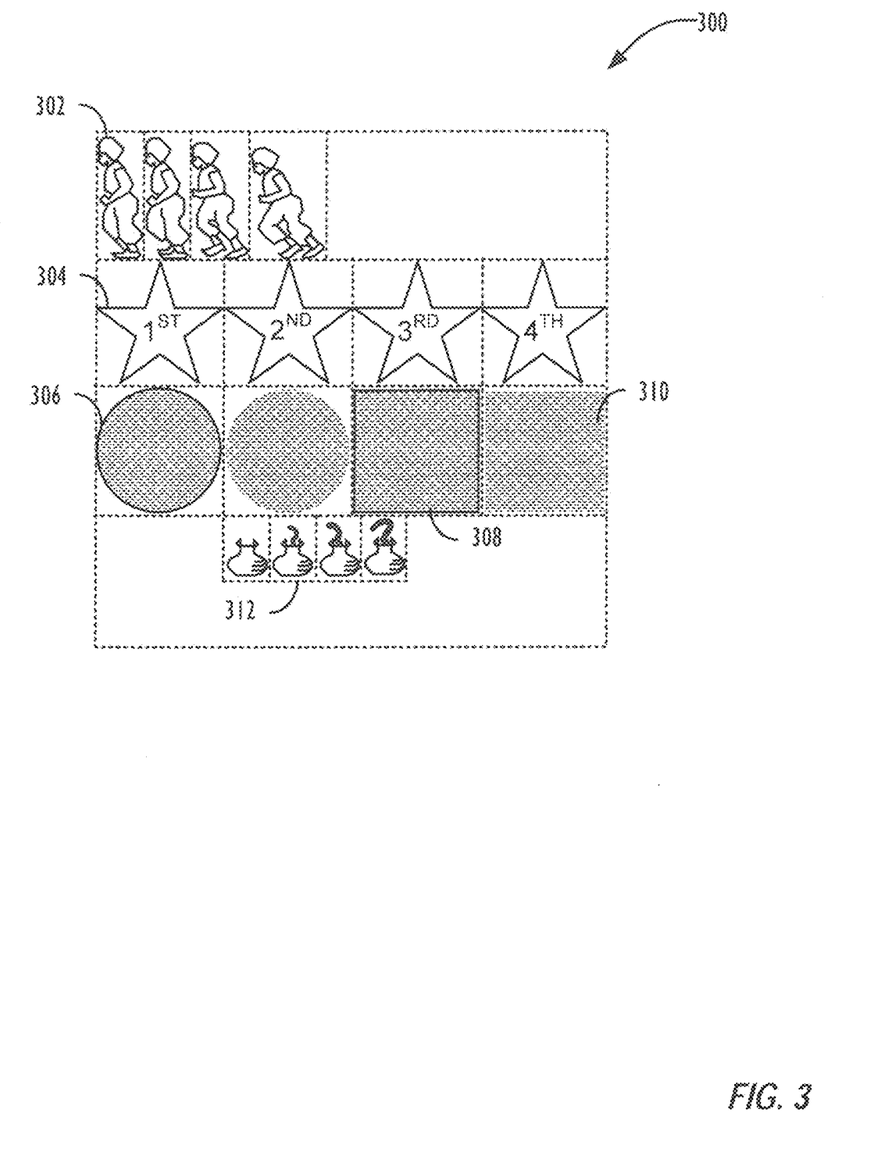
FIG. 3 is a diagram illustrating an exemplary texture atlas comprised of a plurality of individual textures.

Turning now to FIG. 3, a diagram is shown, illustrating an exemplary texture atlas 300 comprised of a plurality of individual textures. Each "sub-image" or texture may be stored within the texture atlas inside an individual sub-rectangle, having its own set of relative texture coordinates and dimensions with respect to the texture atlas 300. As shown in FIG. 3, a single texture atlas may combine "character"-type sprites, such as the sprites 302 showing the various stages of a "running" character in the top row. Such sprites may be shown in sequence at a determined rate to animate a version of the character appearing to "run" across the screen. Animations for individual textures include actions like scaling, movement, fading, timed wait, rotation, etc. In addition, each of these building blocks can be placed into either a "Group" animation (parallel) or a "Sequence" animation (sequential). The groups and sequences themselves can also be placed within other groups/sequence to create complex animations.

The texture atlas may also be used to store simple static graphics to be used in an application, such as the stars 304 in the second row of the texture atlas 300. The texture atlas may also include textures that may be tiled over a 2D or 3D surface to create the appearance of an object that is made of a particular material, such as the brick-like textures 306 in the third row of texture atlas 300. Finally, the small pot-like elements 312 in texture atlas 300 reflect the fact that all images stored in the texture atlas need not have the same size bounding sub-rectangle.

As described above in reference to FIG. 2, tools exist to allow developers to refer to textures by name, creating a texture atlas that maps names to textures. However, those tools do not intelligently modify the incoming textures to the atlas as they are added so that the textures will be displayed without undesirable visual artifacts, e.g., when tiled or used as character sprites in the application. One potential approach to avoiding undesirable visual artifacts when tiling sub-textures pulled from a texture atlas would be to simply extrude a single-pixel transparent border around each sub-texture in the texture atlas so that the hardware does not "bleed into" pixel values from the neighboring sub-texture(s) when sampling sub-textures out of the texture atlas. However, in the case of textures that are used as repeated, i.e., tiled, backgrounds, the extruded single-pixel transparent border may result in undesirable "seams" appearing between the individual tiles mapped onto the surface(s) in the application as rendered in the ultimate display space. Other undesirable visual artifacts may include "sparkle," i.e., the appearance that a pixel(s) is flickering on and off in what is intended to be a static surface in the application. Thus, in one embodiment as described herein, an automatic texture atlas capability intelligently modifies a texture atlas in a process that is done automatically for the developer.

According to some embodiments, an intelligent texture atlas modification process analyzes each input sub-texture to the atlas on a per-edge basis. For example, if the particular sub-texture is sufficiently opaque on all edges, then it may be determined to be a tiling image. In such a case, one embodiment may extrude, i.e., push, out an additional single-pixel border around the image, wherein the additional single-pixel is a duplicate of the pixel along the edge of the sub-texture. The graphics hardware may then be instructed to only draw the "inside" part of the sub-texture (i.e., excluding the additional single-pixel border) when the developer seeks to use the particular sub-texture. If the graphics hardware faces a situation where it needs to sample beyond the "inside" party of the sub-texture, e.g., if the sub-texture has been rotated or is moving across the screen, etc., the sample will only "bleed" into the sub-texture's own pixels, i.e., the single-pixel extrusion, rather than a neighboring sub-texture in the texture atlas or a transparent padding pixel, either of which could case undesirable visual artifacts in the ultimate display space.

If, instead, the particular sub-texture is not sufficiently opaque on a particular edge, then it may be determined that at least that edge of the sub-texture is intended to be non-tiling. In such a case, one embodiment may extrude, i.e., push, out an additional single-pixel border around the edge, wherein the additional single-pixel is a transparent pixel along the edge of the sub-texture. Thus, if the graphics hardware faces a situation where it needs to sample beyond the "inside" party of the sub-texture, the sample will only "bleed" into a transparent padding pixel, which could avoid undesirable visual artifacts in the ultimate display space, such as sampling a pixel from an adjacent sub-texture or "wrapping" around to sample a pixel from the opposite edge of the sub-texture.

According to some embodiments, it is determined whether the alpha value, i.e., opacity, of the edge pixels are above a certain threshold of opacity. As will be discussed in reference to FIG. 5, according to some embodiments, the value of the opacity threshold may be determined, at least in part, based upon the gamma value of the display where the textures will ultimately be display.

According to some embodiments, the sub-texture modification process may require three or more sufficiently opaque pixels in a row along a given edge before extruding out the additional single-pixel border around the edge. This may help to reduce the number of "false positives" identified by the process as potentially tileable edges. The precise number of consecutive sufficiently opaque pixels required before the process deems the edge tileable may be based, at least in part, on the resolution of the display where the sub-texture images is displayed. As may be understood, the relevant consideration when determining the required number of consecutive sufficiently opaque pixels found along an edge is actually the number of "projected" pixels that the sub-texture will be mapped to in the ultimate display space, rather than the actual raw number of pixels in the source sub-texture as stored in the texture atlas. For example, if a character sprite was going to be very tiny when mapped to the ultimate display space, a lower threshold for consecutive sufficiently opaque pixels may be more appropriate. However, if the character sprite was going to be very large when mapped to the ultimate display space, then even a single sufficiently opaque pixel in the source sub-texture could make a big difference in the way the ultimate projection of the sub-texture looks, assuming a one-to-one texel to pixel expansion.

Figure 4:
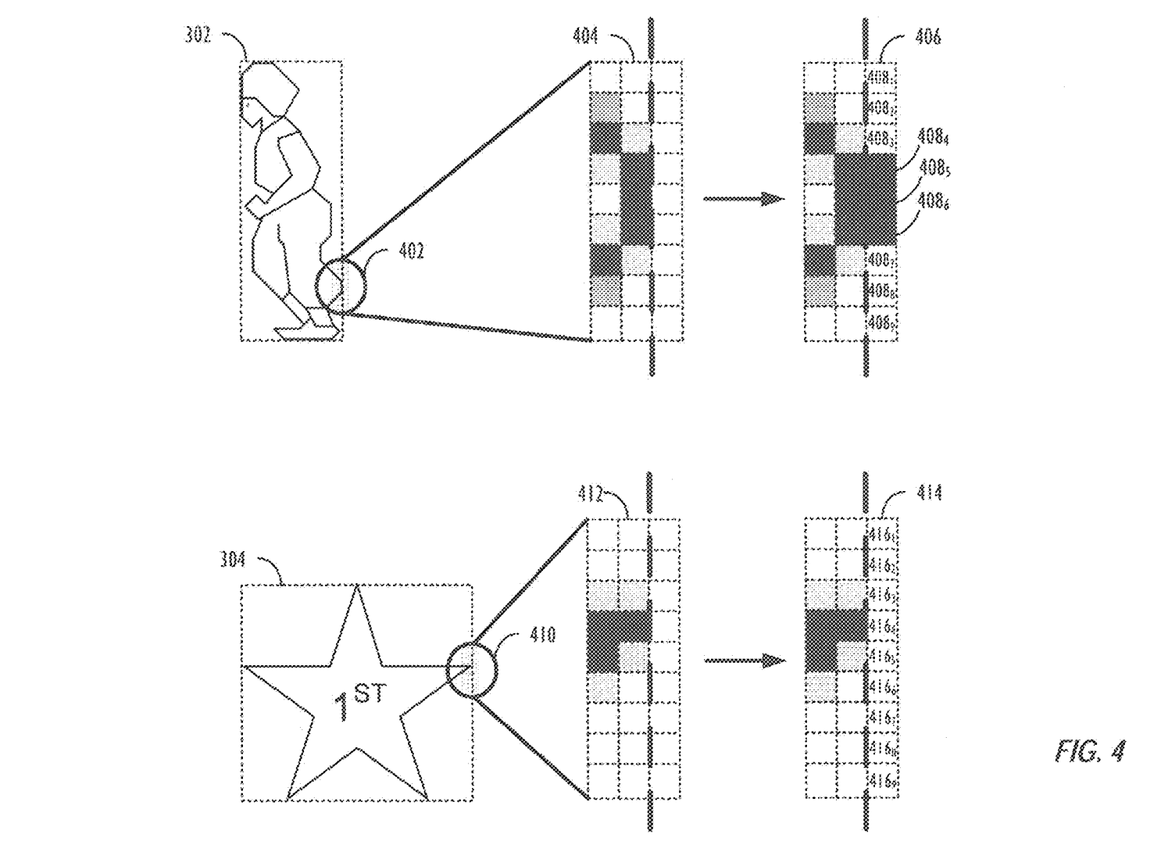
FIG. 4 illustrates various texture edges and intelligent modification techniques, according to several embodiments.

Referring now to FIG. 4, various texture edges and intelligent modification techniques are illustrated, according to several embodiments. First, an edge 402 of character sprite sub-texture 302 from texture atlas 200 will be examined in magnified form so that the exemplary pixel values may be seen more clearly. In particular, the magnified edge 402 comprises the back of one of the pant legs of the character sprite sub-texture 302. This edge occurs on the right-hand side of the bounding sub-rectangle represented by the dashed line drawn around character sprite sub-texture 302.

As described above, according to some embodiments, the intelligent sub-texture modification techniques described herein may examine the opacity values of the edge pixels of the sub-texture, which are represented here by the nine exemplary pixels shown in column 404, in order to determine if a sufficient number of edge pixels are sufficiently opaque so as to deem the edge tileable. In this case, the fourth, fifth, and sixth pixels in column 404 are deemed to be sufficiently opaque, and the threshold for consecutive sufficiently opaque edge pixels has been set at three, thus, this edge of sub-texture 302 has been deemed tileable. The results of the single-duplicate pixel extrusion process that is employed for tileable textures are shown in column 406. In particular, transparent pixels are added at positions $408_1$-$408_3$ and $408_7$-$408_9$ (i.e., directly across the sub-rectangle border from the pixels that are not deemed to be sufficiently opaque), and duplicate pixels are extruded out at positions $408_4$-$408_6$ (i.e., directly across the sub-rectangle border from the pixels that are deemed to be sufficiently opaque).

FIG. 4 also shows an edge 410 of the star-shaped sub-texture 304 from texture atlas 200 in magnified form so that the exemplary pixel values may be seen more clearly. In particular, the magnified edge 410 comprises the tip of one of the points of star-shaped sub-texture 304. This edge occurs on the right-hand side of the bounding sub-rectangle represented by the dashed line drawn around star-shaped sub-texture 304. As described above, according to some embodiments, the intelligent sub-texture modification techniques described herein may examine the opacity values of the edge pixels of the sub-texture, which are represented here by the nine exemplary pixels shown in column 412, in order to determine if a sufficient number of edge pixels are sufficiently opaque so as to deem the edge tileable. In this case, only the fifth pixel in column 412 is deemed to be sufficiently opaque, and the threshold for consecutive sufficiently opaque edge pixels has been set at three, thus, this edge of sub-texture 304 has been deemed non-tileable. The results of the single-transparent pixel extrusion process that is employed for non-tileable textures are shown in column 414. In particular, transparent pixels are added at positions $416_1$-$416_9$ (i.e., directly across the sub-rectangle border from each of the pixels comprising the edge of the sub-texture). Hence, even though there was a single opaque pixel along this edge, the process deemed that sub-texture 304 was not meant to "fit together" with adjacent sub-textures in the application, and thus extruded a single-pixel transparent border.

Figure 5:
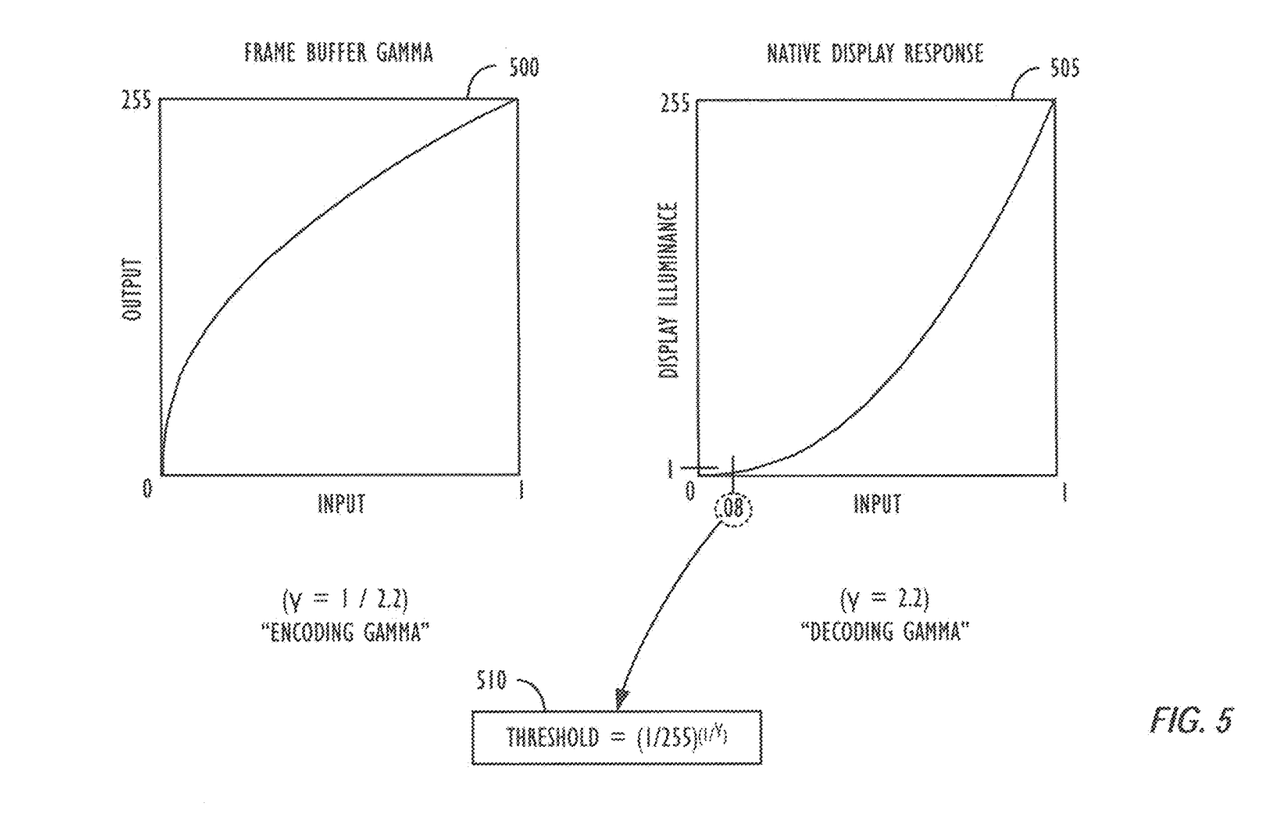
FIG. 5 is an exemplary graph illustrating the relationship between display gamma and opacity threshold.

Turning now to FIG. 5, an exemplary graph 505 illustrating the relationship between display gamma and opacity threshold is shown. "Gamma," is the name given to the nonlinear operation commonly used to encode luma values and decode luminance values in video or still image systems. Gamma, γ, may be defined by the following simple power-law expression: $L_{out}=L_{in}^\gamma$, where the input and output values, $L_{in}$ and $L_{out}$, respectively, are non-negative real values, typically in a predetermined range, e.g., zero to one. A gamma value greater than one is sometimes called an encoding gamma, and the process of encoding with this compressive power-law non-linearity is called gamma compression; conversely, a gamma value less than one is sometimes called a decoding gamma, and the application of the expansive power-law nonlinearity is called gamma expansion. Gamma encoding helps to map data into a more perceptually uniform domain.

Referring to FIG. 5, a Frame buffer Gamma Function 500 and an exemplary Native Display Response 505 are shown. The horizontal, i.e., x-axis, of Frame buffer Gamma Function 500 represents input image values spanning a particular range, e.g., from zero to one. The vertical, i.e., y-axis, of Frame buffer Gamma Function 500 represents output image values spanning a particular range, e.g., from zero to one. In some embodiments, image values may enter the frame buffer already having been processed and have a specific implicit gamma. As shown in graph 500 in FIG. 5, the encoding gamma is roughly 1/2.2, or 0.45. That is, the line in graph 500 roughly looks like the function, $L_{OUT}=L_{IN}^{0.45}$. Gamma values around 1/2.2, or 0.45, are typically used as encoding gammas because the native display response of many display devices have a gamma of roughly 2.2, that is, the inverse of an encoding gamma of 1/2.2.

The x-axis of Native Display Response Function 505 represents input image values spanning a particular range, e.g., from zero to one. The y-axis of Native Display Response Function 505 represents output image values spanning a particular range, e.g., from zero to one. In theory, systems in which the decoding gamma is the inverse of the encoding gamma should produce a desired overall 1.0 gamma boost.

As mentioned above, according to some embodiments, the value of the opacity threshold may be determined, at least in part, based upon the gamma value of the display where the textures will ultimately be display. For example, equation 510 shown in FIG. 5 may be used to determine the threshold value for opacity.

$$\text{Threshold} = (1/255)^{1/\gamma} \qquad \text{(Eqn. 510)}$$

The value (1/255) in Eqn. 510 reflects the fact that the threshold represents the value at which the input will be encoded as a '1' in output 8-bit space (i.e., encoded values ranging from 0 to 255). The value of this fraction could change for a given implementation, for example, if it is desired to disregard larger encoded output values, or if the values are being encoded into an output space with a bit-depth larger or smaller than 8-bits. Thus, for a display with a gamma value of 2.2, an input value of 0.73 (on a normalized 0 to 1 scale) corresponds to 50% luminance output (i.e., a value of 128 when quantized to 8-bit) in terms of the display's response, whereas input values below about 0.08 (on a normalized 0 to 1 scale) correspond to a luminance value of 0 or 1 when quantized to 8-bit. Thus, for opacity values falling below about 0.08, the intensity of the pixel in the ultimate display space will be imperceptible to the viewer based on the display gamma, so the pixel may be treated as a transparent pixel. In some embodiments, the opacity threshold may be selected to be a value between 0.05 and 0.10 (on a scale of 0 to 1), with lower threshold values being selected for more conservative approaches and higher threshold values being selected for approaches that are more aggressive with respect to deeming pixels imperceptible to the end viewer of the sub-texture.

Figure 6:
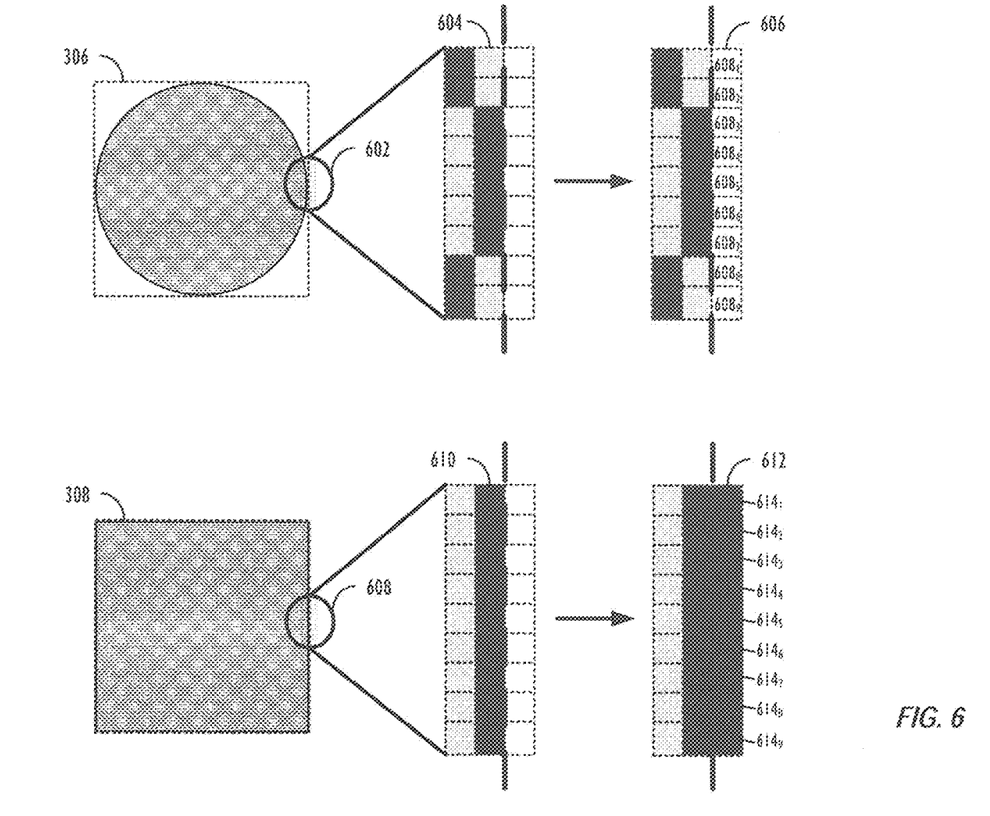
FIG. 6 illustrates various texture edges of different concavities and intelligent modification techniques, according to several embodiments.

Referring now to FIG. 6, various texture edges of different concavities and intelligent modification techniques are illustrated, according to several embodiments. First, an edge 602 of circular sub-texture 306 from texture atlas 200 will be examined in magnified form so that the exemplary pixel values may be seen more clearly. In particular, the magnified edge 602 comprises the edge of one of the sides of circular sub-texture 306. This edge occurs on the right-hand side of the bounding sub-rectangle represented by the dashed line drawn around character sprite sub-texture 306.

As described above, according to some embodiments, the intelligent sub-texture modification techniques described herein may examine the opacity values of the edge pixels of the sub-texture, which are represented here by the nine exemplary pixels shown in column 604, in order to determine if a sufficient number of edge pixels are sufficiently opaque so as to deem the edge tileable. In this case, the third, fourth, fifth, sixth, and seventh pixels in column 604 are deemed to be sufficiently opaque, and using the threshold for consecutive sufficiently opaque edge pixels discussed above of three, this edge of sub-texture 306 would normally be deemed tileable.

However, according to some embodiments, an additional heuristic may be applied to the edge of the sub-texture being examined. In particular, the concavity of the edge may be determined. For example, the concavity may be measured by evaluating the second derivative of a line approximating the edge being evaluated. If the edge is deemed to be sufficiently convex, then the normal decision to deem the edge tileable may be overridden, in effect deeming the edge to be non-tileable—despite the fact that it possessed a greater than required number of consecutive pixels that met the opacity threshold. The reason for the application of this additional concavity heuristic is that the inventors have realized a potential risk of deeming all convex shapes, such as circular sub-texture 306, to be tileable. In particular, for edges that actually reflect an outward "bump," rather than a "flat" surface, it may be more desirable to extrude a one-pixel transparent border than a one-pixel duplicated border, since it is less likely that the convex texture is meant to fit closely together with other convex textures, e.g., in a tiled background fashion.

The results of the single-pixel extrusion process that is employed for convex textures (that would otherwise be deemed tileable) are shown in column 606. In particular, transparent pixels are added at positions $608_1\text{-}608_9$ (i.e., directly across the sub-rectangle border from each of the pixels comprising the edge of the sub-texture). Hence, even though there were greater than three sufficiently opaque pixels along this edge, the process deemed that sub-texture 306 was not meant to "fit together" with adjacent sub-textures in the application, and thus extruded a single-pixel transparent border.

FIG. 6 also shows an edge 608 of square-shaped sub-texture 308 from texture atlas 200 in magnified form so that the exemplary pixel values may be seen more clearly. This edge occurs on the right-hand side of the bounding sub-rectangle represented by the dashed line drawn around square-shaped sub-texture 308. As described above, according to some embodiments, the intelligent sub-texture modification techniques described herein may examine the opacity values of the edge pixels of the sub-texture, which are represented here by the nine exemplary pixels shown in column 610, in order to determine if a sufficient number of edge pixels are sufficiently opaque so as to deem the edge tileable. In this case, each pixel in column 610 is deemed to be sufficiently opaque, and the threshold for consecutive sufficiently opaque edge pixels has been set at three, thus, this edge of sub-texture 308 would be deemed tileable. Application of the optional concavity heuristic to edge 608 would confirm the edge was not convex (i.e., more "flat" than "outward bump"), and thus the normal decision to deem the edge tileable would not be overridden. The results of the single-duplicate pixel extrusion process that is employed for tileable textures are shown in column 612. In particular, duplicate pixels are added at each of positions $614_1\text{-}614_9$ (i.e., directly across the sub-rectangle border from each of the pixels comprising the edge of the sub-texture). Hence, sub-texture 308 as modified could safely be sampled and projected into the ultimate display without the risk of bleeding into an adjacent sub-texture's pixels.

Figure 7:
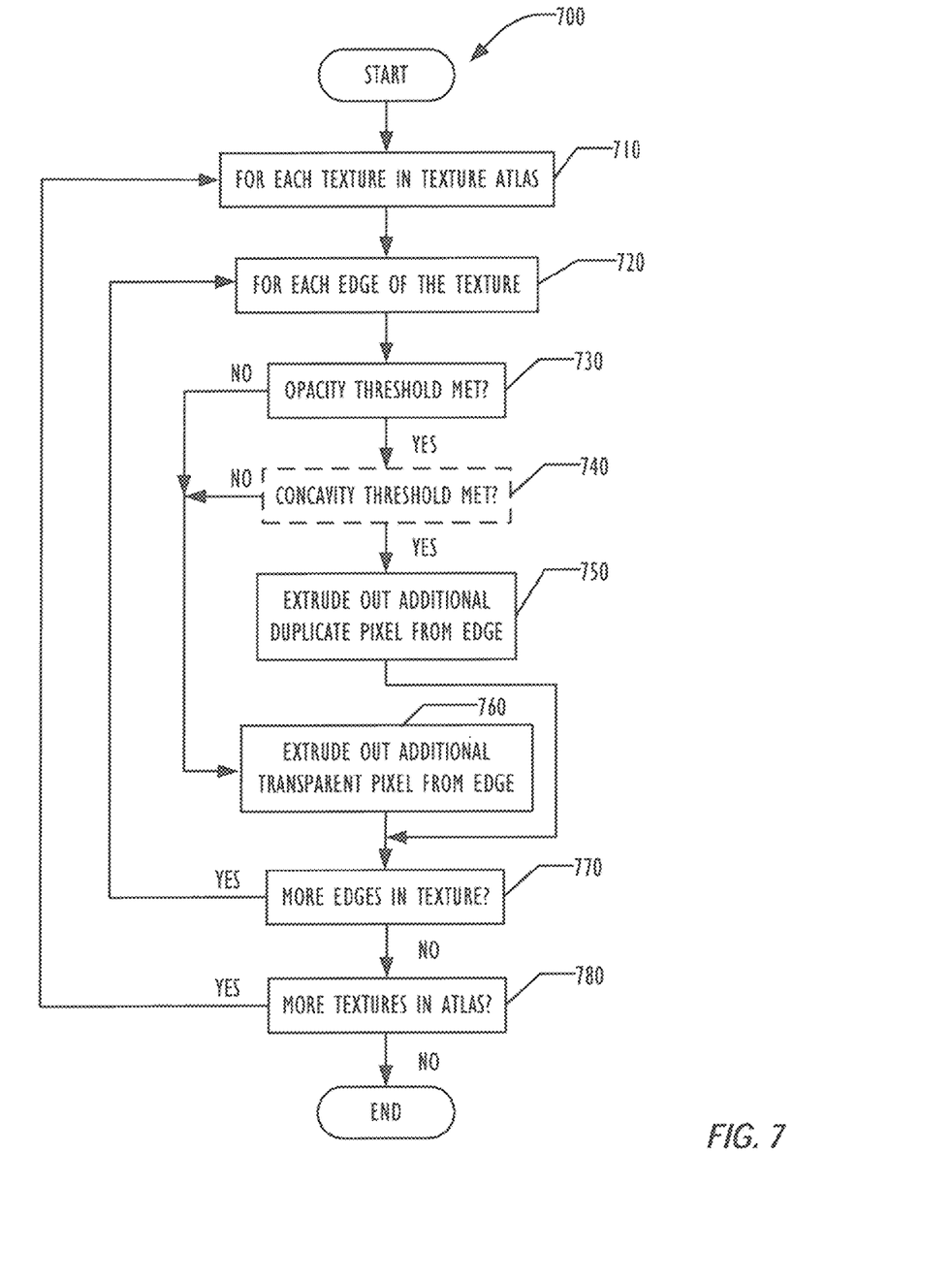
FIG. 7 is a flowchart illustrating a technique for automatically and intelligently modifying images within a texture atlas, according to one embodiment.

Referring now to FIG. 7, a flowchart 700 illustrating a technique for automatically and intelligently modifying images within a texture atlas is shown, according to one embodiment. First, at block 710, the process begins by iterating over each texture in the texture atlas. Next, at block 720, the process iterates over each edge of each texture in the texture atlas. The first inquiry for a respective edge is the opacity threshold test at block 730. As described above, the opacity threshold test may involve comparing the opacity of each pixel along the edge to a predetermined opacity threshold, as well as optionally requiring a consecutive number of sufficiently opaque pixels along the edge before determining that the opacity threshold is met. If the opacity threshold is not met, the process may proceed to block 760 to extrude out an additional one-pixel transparent border around the edge.

If instead, the opacity threshold is met at block 730, the process may optionally employ a concavity threshold test at block 740. As described above, the concavity threshold test may involve determining whether the edge is sufficiently convex and, if so, overriding the determination that the edge is otherwise deemed tileable. Thus, if the concavity threshold is not met, the process may proceed to block 760 to extrude out an additional one-pixel transparent border around the edge. If instead the concavity threshold is met (or if one is not employed at all), the process may then proceed to block 750, to extrude out an additional one-pixel duplicate border around the edge.

Next, the process will continue until there are no additional edges to evaluate for the respective sub-texture at block 770. The process will then move on to the next texture in the atlas at block 780 until there are no further textures to evaluate in the atlas. At that point, the process may terminate.

In addition to determining how to treat the edges of every texture put into the texture atlas, some embodiments described herein may also begin the process detailed in FIG. 7 by trimming any additional blank space, e.g., transparent padding pixels, around each incoming sub-texture, but still record the original dimensions of the sub-texture prior to the trimming operation. In such embodiments, additional memory efficiencies may be gained by not storing the additional transparent pixels for each sub-texture in the texture atlas. In such embodiments, the shader program would also need to be written to account for any additional transformations done during the "atlasing" stage, e.g., the blank space trimming operations described above. The shader program may also be written to recalculate the new rendering area with the "resized," e.g., trimmed, texture, such that it will match with the texture drawn at the original texture size and will be placed at the user-specified location within the rendered scene.

Implementation in an Electronic Device

Figure 8:
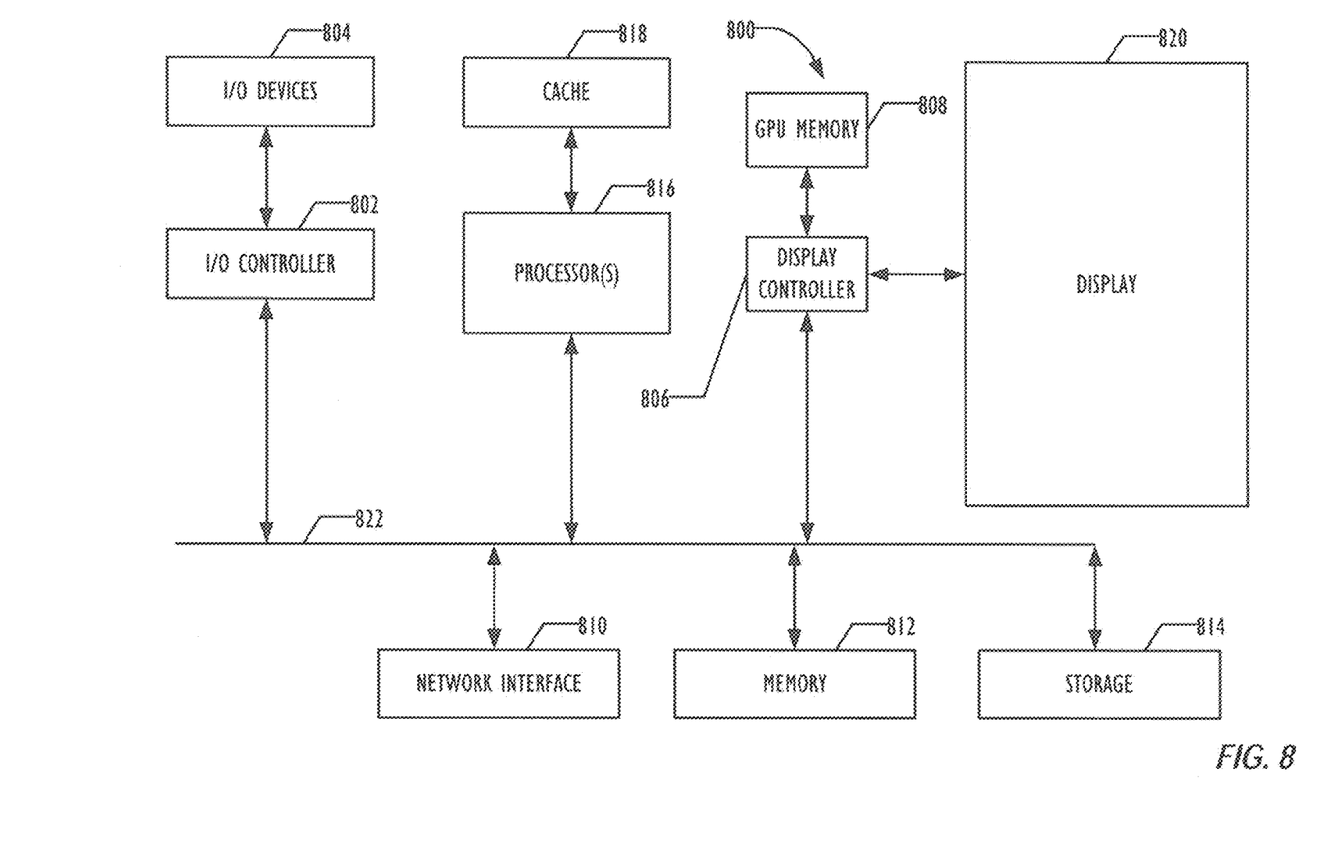
FIG. 8 is a block diagram of a computer system for use with a rendering system according to one embodiment.

FIG. 8 shows one example of a computer system 800 that can be used with one embodiment. For example, the system 800 may be implemented as a part of the systems shown in FIG. 1. While FIG. 8 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.), which have fewer components or perhaps more components may also be used to implement one or more embodiments.

As shown in FIG. 8, the computer system 800, which is a form of a data processing system, includes a bus 822 which is coupled to a microprocessor(s) 816, which may be CPUs and/or GPUs, a memory 812, which may include one or both of a volatile read/write random access memory (RAM) and a read-only memory (ROM), and a non-volatile storage device 814. The microprocessor(s) 816 may retrieve instructions from the memory 812 and the storage device 814 and execute the instructions using cache 818 to perform operations described above. The bus 822 interconnects these various components together and also interconnects these components 816, 818, 812, and 814 to a display controller 806 and display device 820 and to peripheral devices such as input/output (I/O) devices 804 which may be mice, keyboards, modems, network interfaces, printers and other devices which are well known in the art. Typically, the input/output devices 804 are coupled to the system through input/output controllers 802. Where volatile RAM is included in memory 812, the RAM is typically implemented as dynamic RAM (DRAM), which requires power continually in order to refresh or maintain the data in the memory. The display controller 806 and display device 820 may optionally include one or more GPUs to process display data. Optionally, a GPU memory 808 may be provided to support GPUs included in the display controller 806 or display device 820.

The storage device 814 is typically a magnetic hard drive, an optical drive, a non-volatile solid-state memory device, or other types of memory systems that maintain data (e.g., large amounts of data) even after power is removed from the system. While FIG. 8 shows that the storage device 814 is a local device coupled directly to the rest of the components in the data processing system, embodiments may utilize a non-volatile memory which is remote from the system, such as a network storage device which is coupled to the data processing system through a network interface 810, which may be a wired or wireless networking interface. The bus 822 may include one or more buses connected to each other through various bridges, controllers and/or adapters as is well known in the art. Although only a single element of each type is illustrated in FIG. 8 for clarity, multiple elements of any or all of the various element types may be used as desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device, readable by a programmable control device and comprising instructions stored thereon to cause one or more processing units to:
   obtain a first plurality of input images;
   generate a texture atlas comprising the first plurality of input images;
   determine a type of interpolation mode for each edge of each image in the first plurality of input images, wherein the instructions to determine the type of interpolation mode for each edge of an image further comprise instructions to:
      identify tileable edges based, at least in part, on determining that greater than or equal to a first number of edge pixels in the edge have opacity values above a first threshold and the edge is not convex; and
      identify non-tileable edges based, at least in part, on:
         determining that less than the first number of edge pixels in the edge have opacity values above the first threshold; or
         determining that greater than or equal to the first number of edge pixels in the edge have opacity values above the first threshold and the edge is convex; and
      for each edge of each image in the first plurality of images:
         if the edge has been identified as tileable, extrude a one or more pixel border identical to the edge pixels around the edge; and
         if the edge has been identified as non-tileable, extrude a one or more pixel transparent border around the edge.

2. The non-transitory program storage device of claim 1, further comprising instructions to determine the first number of edge pixels based, at least in part, on a resolution of a display where at least one of the input images is displayed.

3. The non-transitory program storage device of claim 2, wherein the first number of edge pixels is three.

4. The non-transitory program storage device of claim 1, further comprising instructions to determine the first threshold based, at least in part, on a gamma value of a display where at least one of the input images is displayed.

5. The non-transitory program storage device of claim 4, wherein the first threshold is between 0.05 and 0.10, on a scale of 0 to 1.

6. The non-transitory program storage device of claim 1, further comprising instructions to store original dimensions of at least one of the plurality of input images and trim blank space around the at least one of the plurality of input images before executing the instructions to generate the texture atlas.

7. The non-transitory program storage device of claim 1, wherein at least one of the first plurality of input images comprises a character sprite.

8. The non-transitory program storage device of claim 1, wherein all of the edges from a first image from the first plurality of input images are identified as tileable edges, and wherein all of the edges from a second image from the first plurality of input images are identified as non-tileable edges.

9. A system, comprising:
a memory having, stored therein, computer program code; and
one or more processing units operatively coupled to the memory and display element and configured to execute instructions in the computer program code that cause the one or more processing units to:
obtain a first plurality of input images;
generate a texture atlas comprising the first plurality of input images;
determine a type of interpolation mode for each edge of each image in the first plurality of input images, wherein the instructions to determine the type of interpolation mode for each edge of an image further comprise instructions to:
identify tileable edges based, at least in part, on determining that greater than or equal to a first number of edge pixels in the edge have opacity values above a first threshold and the edge is not convex; and
identify non-tileable edges based, at least in part, on:
determining that less than the first number of edge pixels in the edge have opacity values above the first threshold; or
determining that greater than or equal to the first number of edge pixels in the edge have opacity values above the first threshold and the edge is convex; and
for each edge of each image in the first plurality of images:
if the edge has been identified as tileable, extrude a one or more pixel border identical to the edge pixels around the edge; and
if the edge has been identified as non-tileable, extrude a one or more pixel transparent border around the edge.

10. The system of claim 9, wherein the instructions in the computer program code further cause the one or more processing units to determine the first number of edge pixels based, at least in part, on a resolution of the display element.

11. The system of claim 10, wherein the first number of edge pixels is three.

12. The system of claim 9, wherein the instructions in the computer program code further cause the one or more processing units to determine the first threshold based, at least in part, on a gamma value of a display where at least one of the input images is displayed.

13. The system of claim 12, wherein the first threshold is between 0.05 and 0.10, on a scale of 0 to 1.

14. The system of claim 9, wherein the instructions in the computer program code further cause the one or more processing units to store original dimensions of at least one of the plurality of input images and trim blank space around the at least one of the plurality of input images before executing the instructions to generate the texture atlas.

15. The system of claim 9, wherein at least one of the first plurality of input images comprises a character sprite.

16. The system of claim 9, wherein all of the edges from a first image from the first plurality of input images are identified as tileable edges, and wherein all of the edges from a second image from the first plurality of input images are identified as non-tileable edges.

17. A method comprising:
obtaining a first plurality of input images;
generating a texture atlas comprising the first plurality of input images;
determining a type of interpolation mode for each edge of each image in the first plurality of input images, wherein the act of determining further comprises:
identifying tileable edges based, at least in part, on determining that greater than or equal to a first number of edge pixels in the edge have opacity values above a first threshold and the edge is not convex; and
identifying non-tileable edges based, at least in part, on:
determining that less than the first number of edge pixels in the edge have opacity values above the first threshold; or
determining that greater than or equal to the first number of edge pixels in the edge have opacity values above the first threshold and the edge is convex; and
for each edge of each image in the first plurality of images:
if the edge has been identified as tileable, extruding a one or more pixel border identical to the edge pixels around the edge; and
if the edge has been identified as non-tileable, extruding a one or more pixel transparent border around the edge.

18. The method of claim 17, further comprising the act of determining the first number of edge pixels based, at least in part, on a resolution of a display where at least one of the input images is displayed.

19. The method of claim 17, further comprising the act of determining the first threshold based, at least in part, on a gamma value of a display where at least one of the input images is displayed.

20. The method of claim 17, wherein at least one of the first plurality of input images comprises a character sprite.

* * * * *